2,244,966

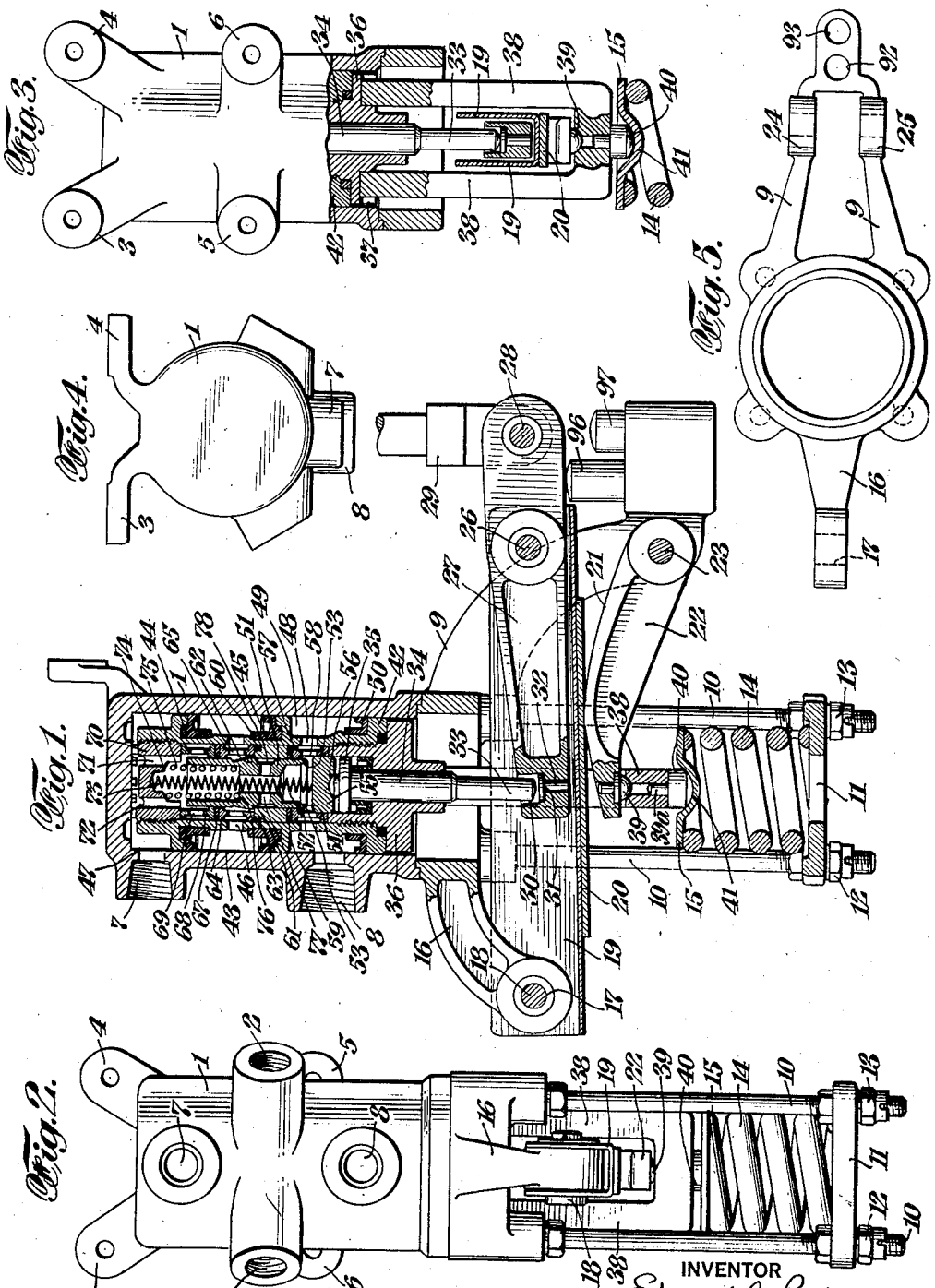

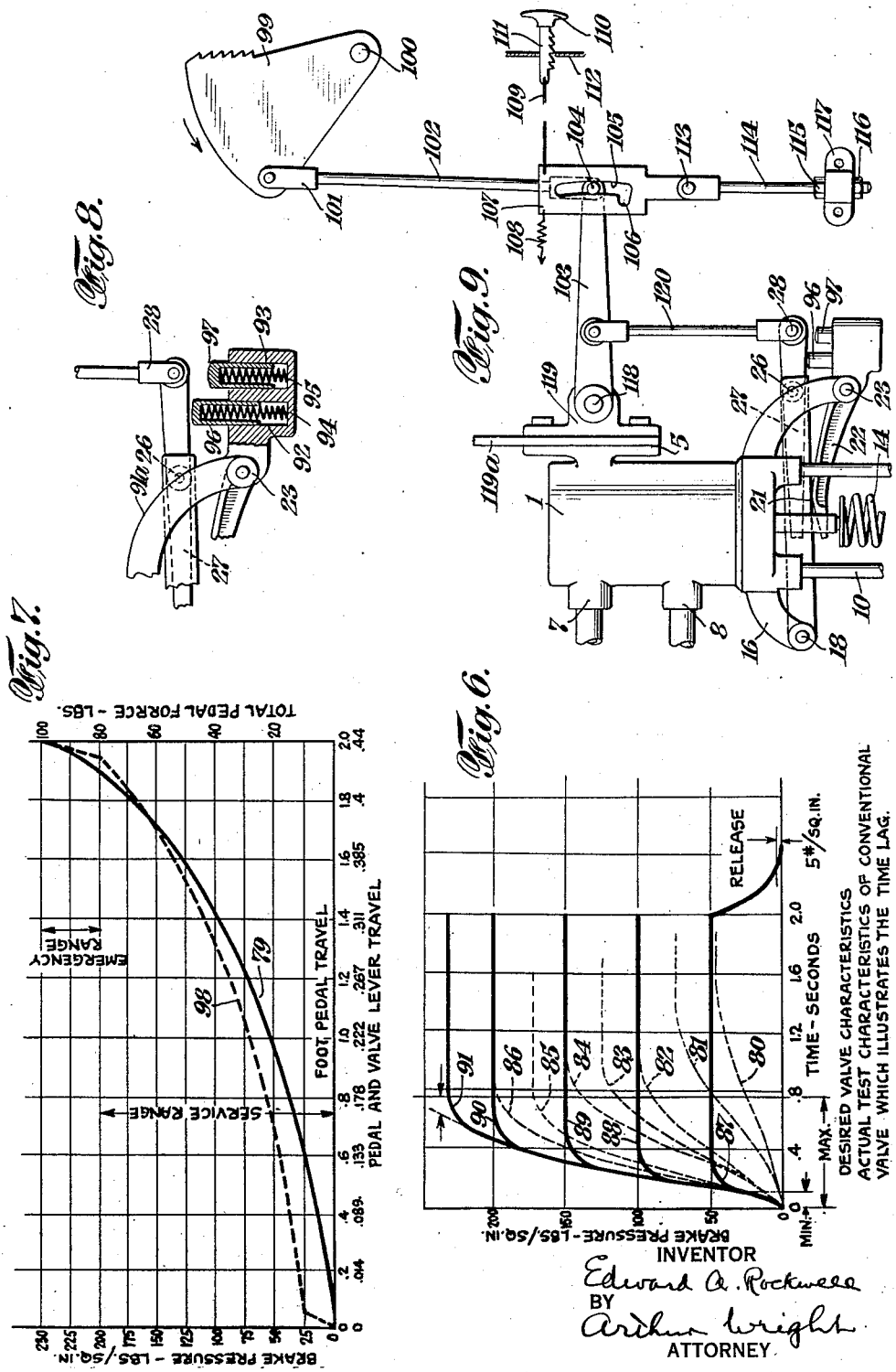
June 10, 1941.  E. A. ROCKWELL  2,244,966
HYDRAULIC POWER CONTROL VALVE
Filed May 13, 1940  2 Sheets-Sheet 2
INVENTOR
Edward A. Rockwell
BY
Arthur Wright
ATTORNEY Patented June 10, 1941

UNITED STATES PATENT OFFICE 2,244,966

HYDRAULIC POWER CONTROL VALVE

Edward A. Rockwell, West Hartford, Conn., assignor to The New Britain Machine Co., New Britain, Conn., a corporation of Connecticut Application May 13, 1940, Serial No. 334,703

40 Claims. (Cl. 303—54)

My invention relates particularly to a valve designed for controlling the application of hydraulic power for the operation of any desired apparatus by said power but has particular application to the control of accessories in automotive constructions, as, for example, airplanes, automobiles, etc.

The object of my invention is to provide a valve by means of which more effective and better controlled application of hydraulic power by hydraulic valves can be obtained. Hitherto, especially in airplane reduction valves, the valves used for controlling the application of hydraulic pressures for the operation of brakes, both on airplanes as well as automobiles, have been of such a character that a greater time element was involved in the application of low hydraulic pressures from a pressure source than in the case of high pressures therefrom. This time differential has resulted in very uncertain control, especially in the case of airplanes, as it was not possible for the pilot to apply uniformly the intended braking pressures. One object of my invention is, therefore, to provide substantially the same time interval of the application of low pressures as in the case of high pressures from said power source. This construction, furthermore, prevents the sudden accidental application of the high pressures in the case where quick operation is desired but only low pressures are intended to be applied to the part to be moved. Furthermore, the valve made in accordance with my invention enables a greater nicety of control to be obtained, especially in the lower range of pressures, as the curve of pressures applied to the part to be moved does not mount too suddenly in the distance of pedal travel in the lower pressure range and, in fact, the pedal travel cannot proceed faster than the increase in the pressures actually applied to the brake, etc. Still another object is to provide a construction with which the pilot can feel when the brakes are in, also the service range and the emergency range of the pressure applied. Further objects of my invention will appear in the detailed description of the same hereinafter.

While my invention is capable of embodiment in many different forms, by way of illustration I have shown only certain forms thereof in the accompanying drawings in which—

Fig. 1 is a vertical section of a valve made in accordance with my invention;

Fig. 2 is a side elevation thereof;

Fig. 3 is another side elevation thereof partly in section;

Fig. 4 is a plan view thereof;

Fig. 5 is a plan view of the lever bracket on the valve;

Fig. 6 is a diagram showing the curve of operation of the valve made in accordance with my invention as compared with the curves obtained generally by previous constructions, based on brake pressures applied by the valve as compared with the time element of applying the pressure;

Fig. 7 is a diagram showing the preferred curves of the brake pressures applied by my valves as compared with the pedal travel and valve lever travel in the two forms of my invention, in the drawings;

Fig. 8 is an elevation of a spring stop mechanism which may be used with the mechanism shown in Figs. 1 to 5, so as to give a "feel" when the brakes are set and a "feel" and the end of the service range where the emergency range begins, as shown in one of the curves in Fig. 7; and Fig. 9 is an elevation of a brake control with which the valve can be used.

In the drawings, I have shown a valve casing 1 having alternative inlets 2 for a high pressure hydraulic liquid, which delivers to the valve a pressure, for example of 250 pounds per square inch or more, or any other desired pressure, from any suitable source of liquid pressure, as for example the source of liquid pressure as shown in my application upon Electro flow power supply systems, Ser. No. 28,699, filed June 27, 1935, Patent No. 2,136,638, granted November 15, 1938, as well as in the division thereof, upon Valve and booster system, Ser. No. 234,637, filed October 12, 1938. The valve casing I has any desired type of brackets 3, 4, 5 and 6 thereon for attaching it at any desired point on the automotive vehicle, as for example an airplane. Also, the said valve casing I has an outlet port 7 for delivering modulated pressure from the valve to any desired part to be moved thereby, as for example the brakes of an airplane. Furthermore, the said casing I has a return outlet 8 for the liquid discharged from the valve, and which returns to the pressure source or any other desired point, as for example in my application aforesaid. Supported from the lower end of the casing I there is a bracket 9 having four depending screws 10 provided at the lower portion thereof with a spring-retainer plate 11 held in position by nuts 12 and 13 so as to support a strong coil spring 14, which is selected to suit the particular brakes but which may be, for example, a spring requiring 600 pounds to deflect it ¼", the upper end of the spring 14 being arranged to rest against a centrally depressed disk 15. The left end of the bracket 9 has an arm 16 provided with a pivotal support 17 having an opening carrying a pin 18 to act as the pivotal support for a lever 19 which is U-shaped in cross-section and which has on its under-surface a wear-plate 20 for cooperating with an upper curved cam surface 21 adjacent to a downwardly directed surface to clear the lever 19, on a lever 22 pivotally supported by a pin 23 carried in ears 24 and 25 on the bracket 9. The cam surface 21 is diagrammed so as to provide a shifting point of contact between the cam surface 21 and the wear-plate 20 in order to give a curve of the general character, shown by the curves in Fig. 7 for example. It will be understood that the curved surface 21 may be changed, as desired, to obtain any desired curve of operation, the curves on Fig. 7 being merely examples thereof. On the right-hand end of the lever 19, in Fig. 1, there is a pivot pin 26 to act as a pivotal support for a lever 27, the right-hand end of which is arranged, due to the leverage, so as to be resisted by but exert less resisting force than the spring 14, and which carries a pivotal connection 28 with any desired operating link 29 which may be operated manually or otherwise, as desired, for the control of the valve mechanism, so as to control the delivery of the hydraulic liquid under pressure to the part to be moved, as, for example, the brakes. The lever 27 extends within the U-shaped lever 19, and its inner end has a cylindrical recess 30 in which there is carried a wear-button 31 provided with a stem 32 passing through the lever 27. This wear-button 31 rests beneath a reduced end 33 of a stem 34 having a disk 35 near the upper end thereof. The stem 34 is adapted to move within a plunger head 36 which is arranged to reciprocate in the valve casing 1. Recesses 37 are provided in the under-surface of the head 36 to receive the upper ends of a U-shaped thrust member 38, the lower portion of which passes beneath the lever 19 so as to receive a button 39 in a pocket in the end of the lever 22 extending into a recess and a pin 39a having a similar button 40 positioned in a centrally located depression 41 in the disk 15. This arrangement is provided in order that as soon as power is applied to the brakes there will be a downward thrust from the head 36 on the U-shaped member 38 so as to compress the spring 14 in order to control the travel of the manually operated link 29. The plunger head 36 is screw-threaded into a valve plunger 42, slidably carried within the valve casing 1. On the periphery of the plunger 42 there is an annular inlet chamber 43 communicating with the inlet port 2 for high pressure liquid, said chamber being sealed at its ends by annular seals 44 and 45, and a plurality of inlet openings 46 give access for the high pressure liquid to the valve mechanism. After passing through the valve mechanism the high pressure liquid admitted by the latter is received in a chamber 47 at the upper end of the valve casing 1 and is thence delivered by the port 7 to the brakes or other accessories to be operated. The effluent or discharge liquid passes out of the valve mechanism by ports 48 to an annular chamber 49 in the plunger 42 peripherally sealed by a seal 50 and thence through the discharge port 8. In order to control the course of the hydraulic liquid in this way there is a cylindrical valve member 51 provided with a longitudinal passageway 52 passing through the same, the lower end of which acts as a discharge opening for the released liquid going to the discharge port 8. This end of the cylindrical valve member 51 has a chamfered edge 53 providing a narrow annular valve seat 54 on which there is adapted to seat a reciprocable valve member 55 having a central recess 56 in which the upper end of the stem 34 is adapted to fit. This cylindrical valve 51 is arranged to move upwardly and downwardly within a series of sealed elements. These comprise an annular spacing member 57 having a discharge port 58 communicating with the discharge port 48. Adjacent thereto there is an annular rubber seal 59, adjacent to which there is an annular valve member 60 having a conical valve seat 61 cooperating with a similar valve surface 62 on the cylindrical valve 51. The area and diameter of the valve seat 61 and the valve surface 62 are slightly larger than the area and diameter of the valve surface 54. Adjacent to the valve member 60 there is an annular seal 63 which in turn is adjacent to an annular spacing member 64 having ports 65 connecting with the inlet port 46. Just above this spacing member 64 there is an annular rubber seal 67 and adjacent to this there is a spacing member 68 having ports 69. This spacing member 68, at its upper end, rests against a screw plug 70 in the plunger 42 which has vertical ports 71 leading to an annular recess 72 in the upper face of the screw plug 70. The ports 71 serve to convey the modulated high pressure liquid to the ports 7 and thence to the brakes. This screw plug 70 also serves as a support for one end of an internal spring 73 the lower end of which rests against the valve member 55 to normally keep the same off its seat 54. Furthermore, outside of said spring 73 the screw plug 71 has a shoulder 74 to support the upper end of an outer spring 75, the lower end of which rests against an internal shoulder 76 within the cylindrical valve member 51, the purpose of which is to normally keep the inlet valve 61, 62 closed. Said cylindrical valve member 51, furthermore, has a number of radial ports 77 communicating with an annular recess 78 so as to conduct the liquid received through the inlet valve 61, 62 to the interior of the cylindrical valve member 51 and thence to the upper end of the cylindrical valve member 51, whence it is conveyed by the port 7 to the brakes. When thus being applied to the brakes, the pressure from the body of oil is applied incidentally to the upper end of the cylindrical valve 51 having a diameter and area somewhat larger than the diameter and area of the inlet valve 61, 62 and also exerts a pressure downwardly on the plunger 42, thus causing the pressures supplied to the brakes to act simultaneously downwardly through the U-shaped member 38 to compress the spring 14.

The mechanism constructed as above will give, by means of the cam surface 21, a curve such as the curve 79 shown in Fig. 7. The diagram in Fig. 7 shows this curve as plotted against brake pressures per square inch, as shown in the ordinates, and the travel of the manual movable parts in the abscissas, the upper set of figures in the latter indicating the foot pedal travel and the lower set of figures indicating the travel of the pivot 28 of the valve lever 27. In other words, in the valves constructed as above the foot pedal travel and the valve lever travel are at all times coordinate to the increase of brake pressures applied to the brakes, owing particularly to the spring 14 and the cam surface 21. Accordingly, it is not possible, as in previous reduction valves to lose effective control of the parts to be moved.

by suddenly moving the manual means beyond any coordinate application of pressure applied to the brakes. Furthermore, as a corollary thereto, with this mechanism it is not possible to produce a set of curves such as curves 80, 81, 82, 83, 84, 85 and 86 from the same valve, as shown in Fig. 6, in accordance with which curves a greater time interval of manual pressure was hitherto necessary in order to obtain lower brake level pressures. These curves in Fig. 6 are plotted against ordinates indicating brake pressures per square inch and therewith elapsed time intervals in seconds from the time of application of manual force. Instead of these curves 80 to 86, in the applicant's structure on the contrary, the said diagram shows curves 87, 88, 89, 90 and 91 made from the actual test of one of the applicant's control valves described as above, showing that it does not require a longer time interval to obtain a desired low pressure level on the brakes, but that, on the contrary, in the time interval hitherto desired for obtaining a high pressure level any lower pressure level on the brakes can be obtained within this same time interval.

In Fig. 8 I have shown an elevation of the apparatus which may be used, if desired, comprising an extension 91a from the pivot 23 on the bracket 9 having two pockets 92 and 93 for receiving coil springs 94 and 95, respectively, which help to determine the curve shown in Fig. 7, carried within and covered by hollow plungers 96 and 97, respectively. The spring plunger 96 is spaced slightly from the outer right-hand end of the lever 27 so that the plunger 96 will be contacted by said lever at the end of the point where the brakes have been moved into snug position prior to the service range of brake movement. In other words, when the brakes are set, the contact of the lever 27 with the plunger 96 will produce a "feel" on the foot of the pilot to show that the braking force is beginning to be applied in the braking action. At the end of the service range the lever 27 then contacts with the spring plunger 97, which gives a "feel" to the foot of the pilot, indicating this position of the parts, but this permits the further application of braking force through an emergency range of pressures by depressing the plunger 97. This is shown on the diagram in Fig. 7, by the curve 98.

In Fig. 9 I have shown the usual means for applying the valve operating mechanism for the operation of the brakes which are attached to the usual rudder control of an airplane. As shown therein, there are provided one of the usual type of pedals 99, two of which are on the rudder-bar of the airplane. Accordingly, the pedal 99 is mounted on a pivot 100 on the usual rudder-bar and is connected by a pivoted yoke 101 to a link 102 which at its lower end is pivoted to a lever 103 by means of a pin 104. The pin 104 projects laterally into a curved slot 105 having an upward turn 106 at its lower end, located in a plate 107 normally moved to the left by a spring 108 attached to some part of the airplane, a wire 109 and a hand-operated knob 110 being located on the other side of said plate 107. The spring 108 keeps the plate in such a position that the pin 104 moves only in the up and down portion of said slot and when it is desired to park with the brakes held in a certain position the pin 104, when in its down position, is made to enter the up-turn 106 in the slot by the knob 110 and the lever 103 will then be held in its down position by serrations 111 on the knob 110 being engaged with a perforated plate 112 in fixed position on the airplane. The lower end of the plate 107 is connected by a pivot 113 to a rod 114 which is screw-threaded so as to receive nuts 115 and 116 on the opposite sides of a bracket 117 fastened in any suitable way to the airplane. By this means the elevation of the plate 107 can be adjusted so as to locate the upper and lower ends of the slot 105 at any desired point, inasmuch as these slots form stops for the limits of movement of the pedals 99. The lever 103 is carried on a pivot 118 in an angle bracket 119 secured to a structural part 119a of the airplane as well as to the valve casing by a pair of ears 3, 4, 5, and 6 on said bracket. Furthermore, intermediate its ends the lever 103 is pivotally connected by a link 120 to the link 29 on the lever 27.

In the operation of the control valve as applied, for example, to airplane wheel brakes, as soon as the manually operated link 29 is moved to apply the brakes, the left end of the lever 27 moves upwardly initially, followed by a movement against the force of the spring 14 as the latter is compressed by the U-shaped member 38 due to the wear-plate 20 bearing on the cam surface 21, and the inlet valve 61, 62 thus is immediately opened as soon as the valve 54, 55 has been closed and the cylindrical valve 51 moved upwardly slightly to unseat the valve 61. The high pressure liquid entering the port 2 then escapes past the valve 61, 62 into the interior of the cylindrical valve 51 and thence to the upper end of the valve casing 1 where the pressure, after being received by the brakes, is immediately exerted against the end of the plunger 42 to exert the resultant thrust through the U-shaped member 38 downwardly so as to compress the spring 14. Any desired pressure may thus be applied to the brakes according to the extent of travel of the lever 27, but as this travel increases the reaction on the spring 14 increases as the wear-plate 20 is progressively moved over the cam surface 21 towards the pivot 23, thus decreasing the leverage of the manual effort applied to the spring 14, that is to say decreasing with the travel of the manual means due to the change of fulcrum on the cam surface 21 and with increasingly greater pressures on the brake, as shown in the curve 79. Any one of such pressures may be maintained by the foot, whereupon the valve 61, 62 will close. When the pressure on the brake is to be lessened or released the release of the manual pressure on the link 29 will open the valve 54, 55 and thus release the pressure liquid to the extent desired, through the discharge opening 8 and return it to the source of pressure for placing the same under pressure again in any desired way, after which it can be returned to the inlet port 2 when desired. Due to this leverage arrangement it will thus be seen that the foot, in applying the manual pressure through the link 29, can only travel at all times coordinately to the extent of pressures applied to the brakes, especially as the spring 14 always requires a manual effort in opposition thereto, thus preventing any sudden forward movement of the manual means beyond the pressures being actually applied to the brakes. Furthermore, as shown in Fig. 6, this prevents the disadvantageous feature in the operation of prior reduction valves in which a longer time element was required for producing lower levels of pressures on the brakes. This was a very great disadvantage in the operation of airplanes, where the speed of landing is high and the time factor during landing is very short, so that if the different time element were present for the different pressures obtained there was a resultant serious lack of control of the airplane in landing. This is exemplified in the curves 80 to 86. In my construction, however, as exemplified in curves 87 to 98, there is no longer time element required for the lower level pressures but the lower pressures can be obtained just as quickly as the higher brake pressures and, in fact, the lower brake pressures are attained in sequential order slightly before the higher brake pressures are attained. This enables an extremely effective and dependable control to be obtained in the operation of airplanes, etc., and which, as above stated, is of the utmost importance, especially as applied to the wheel brakes on airplanes.

This control is made even more effective by using the spring stops, as shown in Fig. 8. By this means the brake shoes are operated quickly up to the point where the pilot, due to the "feel" produced, knows that they are set in position, that is to say up to the point where the lever 27 touches the spring housing 96, as shown in the sharp portion at the left end of the curve 98 in Fig. 7. Further application of the manual force depresses the spring housing 96, thus producing the main part of the curve 98 through the service range to be applied to the brakes until the end of said curve is reached, whereupon a "feel" is again felt on the pilot's foot due to the lever 27 contacting with the plunger 97. A slight further depression of the lever beyond this point provides an emergency range beyond the service range, as shown at the right end of the curve 98, which is capable of being used in cases of emergency where the brakes are to be fully and strongly applied in a short period of time.

In the apparatus shown in Fig. 9, the operation is the same except in this instance I have shown the usual pedals 99 for operating the respective brakes of an airplane. When each of these pedals is moved downwardly or upwardly there are limits of movement due to the location of the pin 104 within the slot 105. Furthermore, the brakes can be fastened, for parking purposes, in the on-position by moving the plate 107 to the right by means of the hand-knob 110 thus fastening one of the notches 111 in the plate 112 after the pin 104 has been moved downwardly opposite to the upturn 106 of the slot 105. Furthermore, the stop positions at the bottom and top of the slot 105 can be adjusted by the nuts 115 and 116 on the bar 114 connected to said plate 107.

In the use of these control valves it will be understood, therefore, that at all times the amount of brake pressure is coordinate to the amount of pedal travel permissible and a progressive increase in the pedal travel results always in a coordinate increase in the brake pressures applied, the same being accomplished irrespective of whether a low or high pressure is to be applied to the brakes. Furthermore, all of these pressures are applied, both by an on-modulation as well as an off-modulation, in such a way that the pressures on the brakes at any one time are accompanied by a coordinate amount of reaction on the foot so that the operator has a sense at all times of the amount of pressure which he is applying to the brakes, as well as the beginning and end of the service range of pressures applied. The valve mechanism may be readily installed as the operating leverage may be swung around in a horizontal plane with regard to the valve casing so as to adapt the positions of the liquid ports thereon to the connections to be made thereto on the airplane.

While I have described my invention above in detail I wish it to be understood that many changes may be made therein without departing from the spirit of the same.

I claim:

1. A valve mechanism comprising a source of hydraulic pressure, a valve, the operative positions of which are substantially independent of the degree of the pressures delivered thereby, for controlling the delivery of the fluid pressure from the valve mechanism, manual means for operating said valve, and a device for controlling the delivery of said hydraulic pressure, having an element requiring the extent of movement of the manual means to accord approximately with the degree of the pressures delivered by said device.

2. A valve mechanism comprising a source of hydraulic pressure, a valve for controlling the delivery thereof from the valve mechanism, and a device for limiting the delivery of said hydraulic pressure, said valve being adapted to resist the manual means less than the resisting effect of the remainder of the valve mechanism on the delivery of said hydraulic pressure.

3. A valve mechanism comprising a source of hydraulic pressure, a part adapted to be moved by the application of the hydraulic pressure thereto, a valve for controlling the delivery of the hydraulic pressure from the valve mechanism, and a reaction element arranged to receive a reaction position coordinate with the hydraulic pressures delivered to said part by said valve and fix the position of the manual means in accordance therewith irrespective of the position of said part.

4. A valve mechanism comprising a source of hydraulic pressure, a valve for controlling the delivery thereof from the valve mechanism, manual means for operating said valve, and a spring device for obtaining a travel of the manual means with the increase of pressures delivered by the valve so that the manual means has less travel than said device.

5. A valve mechanism comprising a source of hydraulic pressure, a valve for controlling the delivery thereof from the valve mechanism, manual means for operating said valve, and a device movable coordinately to the movement of the manual means for obtaining decreasing increments of travel of the manual means with an uniform increase of pressures delivered by the valve.

6. A valve mechanism comprising a source of hydraulic pressure, a valve for controlling the delivery thereof from the valve mechanism, manual means for operating said valve, and a device movable coordinately to the movement of the manual means including a spring, for obtaining decreasing increments of travel of the manual means with an uniform increase of pressures delivered by the valve.

7. A valve mechanism comprising a source of hydraulic pressure, a valve for controlling the delivery thereof from the valve mechanism, manual means for operating said valve, and a device for preventing the lapse of a longer time interval in applying a lower level of pressure from the valve than when applying a higher level of pressure therefrom.

8. A valve mechanism comprising a source of hydraulic pressure, a valve for controlling the delivery thereof from the valve mechanism, manual means for operating said valve, and a spring device for preventing the lapse of a longer time interval in applying a lower level of pressure from the valve than when applying a higher level of pressure therefrom.

9. A valve mechanism comprising a source of hydraulic pressure, a valve for controlling the delivery thereof from the valve mechanism, manual means for operating said valve, and a device for enabling substantially even low levels of delivered pressure to be attained before substantially even high levels thereof are reached.

10. A valve mechanism comprising a source of hydraulic pressure, a valve for controlling the delivery thereof from the valve mechanism, manual means for operating said valve, and a spring device for enabling substantially even low levels of delivered pressure to be attained before substantially even high levels thereof are reached.

11. An actuating device comprising a plunger adapted to be moved by a fluid under a pressure differing from the atmospheric pressure to apply force thereby, means associated with the plunger for exerting an increasing resistance to the plunger as it is moved, and a manually movable valve, having a manual controlling device adapted to be resisted in fixed relationship by said means coordinately with the movement of the plunger.

12. An actuating device comprising a plunger adapted to be moved by a fluid under a pressure differeing from the atmospheric pressure to apply force thereby, a spring associated with the plunger for exerting an increasing resistance to the plunger as it is moved, and a manually movable valve, having a manual controlling device adapted to be resisted in fixed relationship by said spring coordinately with the movement of the plunger.

13. An actuating device comprising a plunger adapted to be moved by a fluid under a pressure differing from the atmospheric pressure to apply force thereby, means associated with the plunger for exerting an increasing resistance to the plunger as it is moved, and a manually movable valve having a manual controlling device adapted to be connected to and resisted in fixed relationship by said means coordinately with the movement of the plunger.

14. An actuating device comprising a plunger adapted to be moved by a fluid under a pressure differing from the atmospheric pressure to apply force thereby, a spring associated with the plunger for exerting an increasing resistance to the plunger as it is moved, and a manually movable valve having a manual controlling device adapted to be connected to and resisted in fixed relationship by said spring coordinately with the movement of the plunger.

15. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, a manually operable valve lever for operating said valve, and a member adapted to coordinate the movement of the lever to the resisting means so as to obtain a varying resistance to the advance of the movement of the valve lever.

16. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, a manually operable valve lever for operating said valve, and a member adapted to coordinate the movement of the lever to the resisting means so as to obtain an increasing resistance to the advance of the movement of the valve lever.

17. An actuating device comprising a plunger adapted to be moved by a fluid under a pressure differing from the atmospheric pressure to apply force thereby, a spring associated with the p.unger for exerting an increasing resistance to the plunger as it is moved, a manually movable valve associated with the plunger for controlling the movement of the latter, a manually operated valve lever for operating said valve, and a member adapted to coordinate the movement of the lever to the resisting spring so as to obtain an increasing resistance to the advance of the movement of the valve lever.

18. An actuating device comprising a plunger adapted to bemoved by a fluid under a pressure differing from the atmospheric pressure to apply force thereby, means associated with the plunger for exerting an increasing resistance to the plunger as it is moved, a manually movable valve associated with the plunger for controlling the movement of the latter, a manually operable valve lever for operating said valve, and a member, having a cam surface cooperating with the valve lever, adapted to coordinate the movement of the lever to the resisting means so as to obtain an increasing resistance to the advance of the movement of the valve lever.

19. An actuating device comprising a plunger adapted to be moved by a fluid under a pressure differing from the atmospheric pressure to apply force thereby, a spring associated with the plunger for exerting an increasing resistance to the plunger as it is moved, a manually movable valve associated with the plunger for controlling the movement of the latter, a manually operated valve lever for operating said valve, and a member, having a cam surface cooperating with the valve lever, adapted to coordinate the movement of the lever to the resisting spring so as to obtain an increasing resistance to the advance of the movement of the valve lever.

20. An actuating device comprising a plunger adapted to be moved by a fluid under a pressure differing from the atmospheric pressure to apply force thereby, means associated with the plunger for exerting an increasing resistance to the plunger as it is moved, and a manually movable valve, resisted by said means, associated with the plunger for controlling the movement of the latter, said valve comprising a tubular valve member operating within the plunger and having inlet and outlet valve elements adapted to deliver the pressure from the valve in amounts modulated according to the reaction of the manual effort applied to the valve.

21. An actuating device comprising a plunger adapted to be moved by a fluid under a pressure differing from the atmospheric pressure to apply force thereby, means associated with the plunger for exerting an increasing resistance to the plunger as it is moved, and a manually movable valve, connected to and resisted by said means, associated with the plunger for controlling the movement of the latter, said valve comprising a tubular valve member operating within the plunger and having inlet and outlet valve elements adapted to deliver the pressure from the valve in amounts modulated according to the reaction on the manual effort applied to the valve.

22. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, a manually operable valve lever for operating said valve, and a member adapted to coordinate the movement of the lever to the resisting means so as to obtain an increasing resistance to the advance of the movement of the valve lever, said valve comprising a tubular valve member operating within the plunger and having inlet and outlet valve elements adapted to deliver the pressure from the valve in amounts modulated according to the reaction on the manual effort applied to the valve.

23. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, a manually operable valve lever for operating said valve, and a member, having a cam surface cooperating with the valve lever, adapted to coordinate the movement of the lever to the resisting means so as to obtain an increasing resistance to the advance of the movement of the valve lever, said valve comprising a tubular valve member operating within the plunger and having inlet and outlet valve elements adapted to deliver the pressure from the valve in amounts modulated according to the reaction on the manual effort applied to the valve.

24. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, and a member adapted to coordinate the movement of the lever to the resisting spring so as to obtain an increasing resistance to the advance of the movement of the valve lever, said lever and member being located between the valve and the spring.

25. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, and a member, having a cam surface cooperating with the valve lever, adapted to coordinate the movement of the lever to the resisting spring so as to obtain an increasing resistance to the advance of the movement of the valve lever, said lever and member being located between the valve and the spring.

26. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, a member adapted to coordinate the movement of the lever to the resisting spring so as to obtain an increasing resistance to the advance of the movement of the valve lever, said lever and member being located between the valve and the spring, and a reaction member connecting with the plunger for exerting force against said spring.

27. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, a member having a cam surface cooperating with the valve lever, adapted to coordinate the movement of the lever to the resisting spring so as to obtain an increasing resistance to the advance in the movement of the valve lever, said lever and member being located between the valve and the spring, and a reaction member connecting with the plunger for exerting force against said spring.

28. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, a member adapted to coordinate the movement of the lever to the resisting spring so as to obtain an increasing resistance to the advance of the movement of the valve lever, said lever and member being located between the valve and the spring, and a reaction member connecting with the plunger for exerting force against said spring, said first-mentioned member being located between the reaction member and said spring.

29. An actuating device comprising a plunger adapted to be moved by a fluid under a pressure differing from the atmospheric pressure to apply force thereby, a spring associated with the plunger for exerting an increasing resistance to the plunger as it is moved, a manually movable tubular valve located within the plunger for controlling the movement of the latter, a manually operated valve lever for operating said valve, a member, having a cam surface cooperating with the valve lever, adapted to coordinate the movement of the lever to the resisting spring so as to obtain an increasing resistance to the advance of the movement of the valve lever, said lever and member being located between the valve and the spring, and a reaction member connecting with the plunger for exerting force against said spring, said first-mentioned member being located between the reaction member and said spring.

30. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, manually movable means for operating said valve, and a yieldable stop associated with said last-mentioned means.

31. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, manually movable means for operating said valve, and a yieldable stop associated with said last-mentioned means adapted to be brought into action when the brakes are set at the beginning of the service range of power application.

32. An actuating device comprising a plunger adapted to be moved by a fluid under a pressure differing from the atmospheric pressure to apply force thereby, means associated with the plunger for exerting an increasing resistance to the plunger as it is moved, a manually movable valve associated with the plunger for controlling the movement of the latter, manually movable means for operating said valve, and a yieldable stop associated with said means adapted to be brought into action at the end of the service range and at the beginning of an emergency range of power application.

33. An actuating device comprising a member adapted to be moved by a fluid under a pressure differing from the atmospheric pressure to apply force thereby, means associated with the member for exerting an increasing resistance to the member as it is moved, and a manually movable valve, having a manual controlling device located so as to be resisted by said means coordinately with the movement of the member.

34. An actuating device comprising a member adapted to be moved by a fluid under a pressure differing from the atmospheric pressure to apply force thereby, a spring associated with the member for exerting an increasing resistance to the member as it is moved, and a manually movable valve, having a manual controlling device located so as to be resisted by said spring coordinately with the movement of the member.

35. An actuating device comprising a member adapted to be moved by a fluid under a pressure differing from the atmospheric pressure to apply force thereby, means associated with the member for exerting an increasing resistance to the member as it is moved, and a manually movable valve, having a manual controlling device located so as to be resisted by said means coordinately with but with less effort than in the movement of the member.

36. An actuating device comprising a member adapted to be moved by a fluid under a pressure differing from the atmospheric pressure to apply force thereby, a spring associated with the member for exerting an increasing resistance to the member as it is moved, and a manually movable valve, having a manual controlling device located so as to be resisted by said spring coordinately with but with less effort than in the movement of the member.

37. An actuating device comprising a member adapted to be moved by a fluid under a pressure differing from the atmospheric pressure to apply force thereby, means associated with the member for exerting an increasing resistance to the member as it is moved, a manually movable valve associated with the member for controlling the movement of the latter, a manually operable valve lever for operating said valve, a lever to which it is pivoted, and an arm having a cam surface cooperating with the valve lever and inclined at its end to clear the lever pivoted to the valve lever, adapted to coordinate the movement of the lever to the resisting means so as to obtain an increasing resistance to the advance of the movement of the valve lever.

38. An actuating device comprising a plunger adapted to be moved by a fluid under a pressure differing from the atmospheric pressure to apply force thereby, means associated with the plunger for exerting an increasing resistance to the plunger as it is moved, a manually movable valve, a valve casing therefor having inlet and outlet ports extending crosswise to the path of said valve, and valve operating leverage connected to said casing by means permitting different radial positions of attachment thereto.

39. An actuating device comprising a plunger adapted to be moved by a fluid under a pressure differing from the atmospheric pressure to apply force thereby, means associated with the plunger for exerting an increasing resistance to the plunger as it is moved, and a manually movable valve reciprocable in said plunger, said plunger having an inlet port for said liquid and having a sealed end provided with a liquid discharge port.

40. An actuating device comprising a plunger adapted to be moved by a fluid under a pressure differing from the atmospheric pressure to apply force thereby, means associated with the plunger for exerting an increasing resistance to the plunger as it is moved, a manually movable valve, and a U-shaped connecting member leading from the plunger to the resisting means, the manual device being located between the U-shaped member and the plunger.

EDWARD A. ROCKWELL.